United States Patent [19]

Bruin

[11] Patent Number: 4,597,409

[45] Date of Patent: Jul. 1, 1986

[54] SAFETY DEVICE AGAINST OVERPRESSURE PARTICULARLY FOR GAS PRESSURE CONTROL APPARATUS

[75] Inventor: Adrianus M. J. Bruin, Huizen, Netherlands

[73] Assignee: Beta B.V., The Hague, Netherlands

[21] Appl. No.: 779,606

[22] Filed: Sep. 23, 1985

Related U.S. Application Data

[63] Continuation of Ser. No. 495,660, May 18, 1983, abandoned.

[51] Int. Cl.[4] .............................................. F16K 17/00
[52] U.S. Cl. .................................... 137/461; 137/462; 137/492.5
[58] Field of Search .................... 137/492, 492.5, 489, 137/489.5, 461, 462

[56] References Cited

U.S. PATENT DOCUMENTS

| | | | |
|---|---|---|---|
| 1,139,533 | 5/1915 | Kitchen | 137/489.5 |
| 2,583,006 | 1/1952 | Niesmann | 137/492.5 X |
| 2,877,791 | 3/1959 | Rich | 137/489.5 |

Primary Examiner—Alan Cohan
Attorney, Agent, or Firm—Charles H. Lindrooth; Richard D. Weber

[57] ABSTRACT

The high pressure of a gas transport network must be reduced before the gas is admitted to a distribution network to which consumers, e.g. household appliances are connected.

This reduction is carried out by a gas pressure control installation. If this installation fails, conduit failure, appliance failure, explosion and fire may occur.

A known safety device has a closing spring, which closes a valve if the gas pressure unacceptably rises which causes release of the spring by the gas pressure. The movement releasing the spring is influenced by friction which may have an uncertain value. The invention eliminates friction in that the reduced gas pressure acts on the valve via spring loaded membranes, namely a measuring membrane and an actuating membrane.

11 Claims, 4 Drawing Figures

SAFETY DEVICE AGAINST OVERPRESSURE PARTICULARLY FOR GAS PRESSURE CONTROL APPARATUS

This is a continuation of co-pending application Ser. No. 495,660 filed on May 18, 1983, now abandoned.

The invention relates to a safety device against overpressure of a gaseous or liquid fluid, in which a safety valve in a main supply conduit for the fluid is actuatable by means of a spring loaded actuating member, mounted in a housing, e.g. a membrane, while the pressure to be controlled may be connected through an inlet conduit in the housing.

In a gas distributing network a gas pressure control apparatus is provided between the high pressure transport network and each low pressure distribution network, said control apparatus reducing the high gas pressure to a pressure which is suitable for the consumers. If said pressure would become too high due to failure of such a gas control apparatus, the danger arises that the consumer appliances, conduits and fittings cannot withstand said pressure, which results in conduit failure, failure of appliances, explosions and fire.

Safety devices for preventing this are already known. Of course such a safety device can be used not only for gas distributing networks, but generally for controlling fluid pressures.

The known safety devices have been constructed such that a control mechanism is connected to the safety valve in the main supply conduit for the fluid, said control mechanism being assembled to a unity in a housing together with disengaging clutch and further mechanical elements and the valve disc of the valve. Thereby the force of a closing spring acts on the disengaging clutch, which during normal operation is kept in its latched position, said latch connection being disengaged when the pressure approaches its limit value. The control mechanism and the further mechanical elements are in this construction connected to the disengaging clutch by means of a valve rod such that both are open in the engaged position and are closed in the disengaged position.

This in itself simple construction has the disadvantage that the closing force of the actuating elements in the open position acts on the disengagement clutch. When the closing force increases the friction may become so large that the accuracy of the disengagement is unfavorably influenced. This may even lead to the fact that the safety device does not close the gas supply when failure occurs.

The point of disengagement of this device is namely determined by a spring force adjusted to a predetermined limit value and by the friction at rest which occurs in the disengagement mechanism. While the force of the spring which has been adjusted to the limit value remains unchanged after adjustment thereof and remains each time reproducable, the friction force may change out of control particularly if it has a hysteresis dependent on the direction of movement. In order to keep deviation of the once adjusted disengagement point the smallest possible, the friction force, which cannot be influenced, must be as small as possible.

In view of the shortcomings and/or disadvantages inherent to this prior art, the invention aims at providing a safety device in which the control signal as issued by the control mechanism is directly converted into an actuating signal for the actuating elements and uninfluenced by an uncertain friction value.

This is achieved according to the invention in that the inlet conduit for the pressure to be controlled communicates with a measuring chamber of the second measuring membrane which is secured to a control valve, which in closed position closes the communication between an actuating fluid source and an actuating chamber of the first or actuating membrane, there being also provided a communication conduit between the measuring chamber and the actuating chamber respectively of both membranes.

The invention provides a number of advantages: the control device is structurally simple, has a high accuracy due to the elimination of the friction force and is therefore more dependable in operation.

In a modification of the safety device according to the invention a second control valve communicates with the first or actuating membrane and is adapted to close a port provided in the housing between the actuating chamber of said membrane and a conduit leading to the actuating fluid source.

Thereby the reaction time of the safety device is reduced, particularly if in a preferred embodiment the crosssectional area of the control port of the second control valve is substantially larger than that of the control port of the first mentioned control valve.

One or more conduits may be provided in the housing which open into the actuating chamber of the actuating membrane and communicate with a pneumatic switch or piston serving for actuating the safety valve in the supply conduit for the fluid.

If the reduced outlet pressure is sufficiently high for actuating the safety valve in the main supply conduit for the fluid, then according to another embodiment according to the invention a second control valve may be connected to the actuating membrane, said valve being received in the communication conduit between the measuring chamber and the actuating chamber respectively of both membranes, a second communication conduit being provided between said chambers, said conduit receiving the first control valve.

Preferably also here the crosssectional area of the control port of the second control valve is substantially larger than that of the control port of the first control valve.

The invention will be hereunder further illustrated with reference to the drawing, showing some embodiments of the control device according to the invention.

Figure 1:
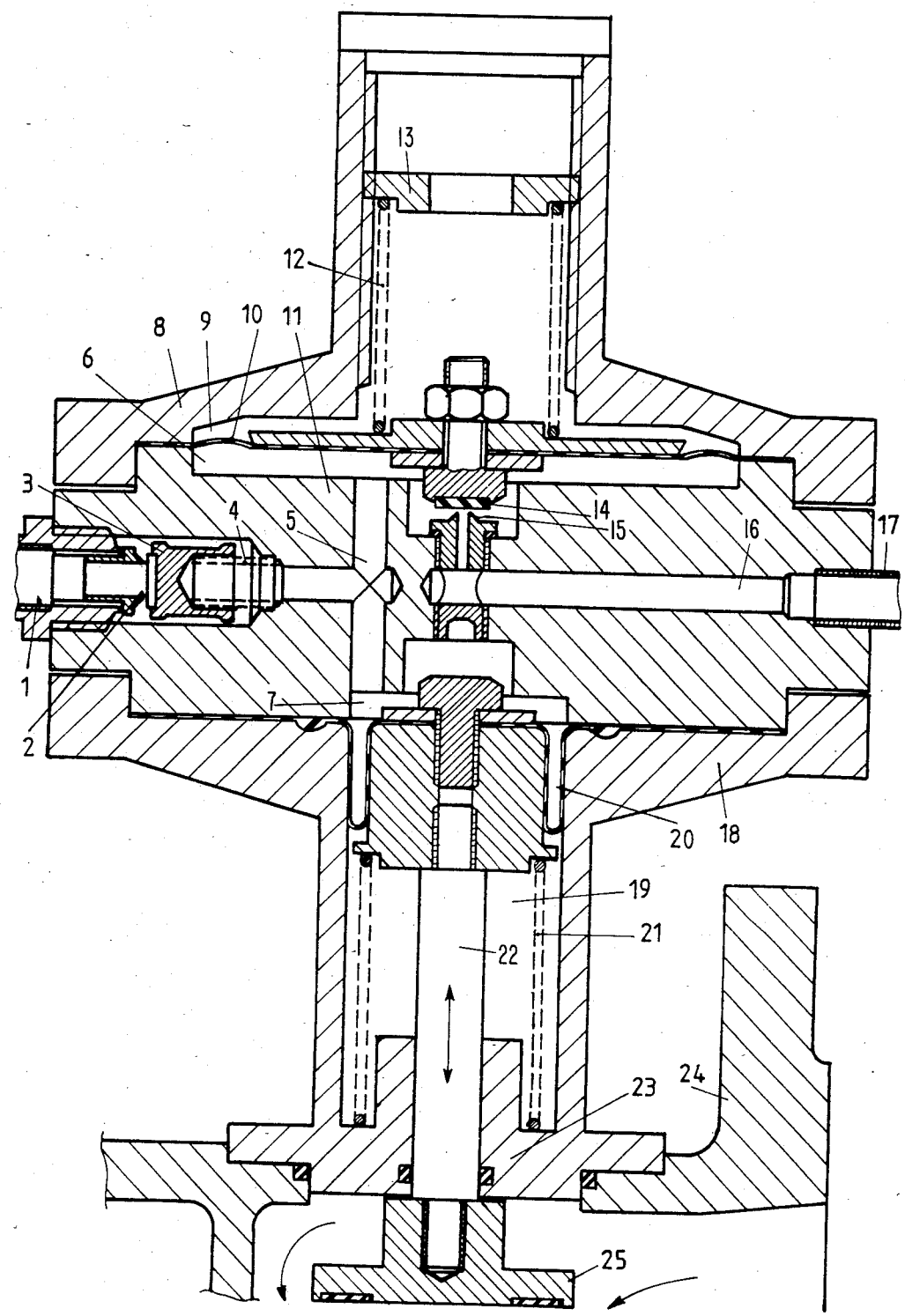
FIG. 1 is a section through a first embodiment in open valve position.

In the embodiment according to FIG. 1 the outlet pressure, e.g. the pressure as reduced by a reduction valve not shown, is in open communication via a measuring or supply conduit 1, a check valve 3 having a seat 2 and a biasing spring 4 and a conduit 5 with a measuring chamber 6 and an actuating chamber 7. The control mechanism comprises a membrane cover 8 secured to the control housing 11, the membrane 10 being clamped between said parts. The space between the membrane cover 8 and the control housing 11 is divided by the membrane 10 into the measuring chamber 6 and a membrane chamber 9. At its upper side the membrane 10 is loaded by a compression spring 12 which abuts an adjusting nut 13.

The lower side of the measuring membrane 10 is loaded by the outlet pressure. A control valve 14 has been secured in the center of said membrane which control valve cooperates with a control port 15 in the control housing. Under normal circumstances said valve 14 is closed, e.g. it closes the control port 15. The control port communicates via a conduit 16 in the control housing with a fluid pressure or control conduit 17.

The actuating mechanism as shown for the valve in the main conduit 24 comprises a rolling membrane cover 18 and a rolling membrane 20, which is clamped between the cover 18 and the control housing 11. The space between the cover 18 and the control housing 11 is divided by the membrane 20 into an actuating chamber 7 and a rolling membrane chamber 19. At its upper side the rolling membrane 20 is loaded under normal circumstances by the outlet pressure. The lower side of the membrane 20 is loaded by a compression spring 21. The movable portion of the membrane 20 is secured to a valve rod 22 which extends through the gastight guiding sleeve 23 into a valve chamber in the main conduit 24. In said chamber a valve disc of the valve is secured to the valve rod 22. Due to the bias of the compression spring 21 the valve disc 25 is kept in the open position relative to a not shown valve seat.

This safety device with its disengagement system and actuating mechanism operates as follows:

The valve disc 25 is opened by the force of the compression spring 21. Thereby the valve disc 25 is moved upwardly until it engages the lower side of the guiding sleeve 23. This expands the compression spring 21 to a spring force value which is larger than the force due to the maximum permissible outlet pressure in the conduit 1, which pressure prevails in the actuating chamber 7, multiplied by the surface of the rolling membrane 20. At the same time this force is lower than the force due to the minimum permissible control pressure, which prevails in the control conduit 17, multiplied by the surface of the membrane 20.

The control valve 14 is closed by the compression spring 12, whereby the valve closes the control port 15. Simultaneously with the closing of the control port 15 the compression spring 12 expands to a value of its spring force, which is larger than the force due to the nominal outlet pressure in the conduit 1, multiplied by the membrane surface, i.e. the pressure at which the control device must not operate.

If the outlet pressure exceeds the adjusted limit value the control mechanism releases the pressure fluid, whereby the valve 25 is closed. The difference in force between the force of the compression spring 12 at the one hand and the excess outlet pressure, multiplied by the membrane surface 10 at the other hand moves the control valve 14 upwardly when the pressure increases, whereby the control port 15 is opened. Thereby the driving fluid in the control conduit 17, e.g. a gas for liquid, can enter the measuring chamber 6 and thereby the membrane 10 will be moved further upwardly against the force of the spring 12, due to the higher pressure of the driving fluid. The driving fluid likewise flows via the conduit 5 to the actuating chamber 7 of the roller membrane 20. Now under the influence of the difference in the forces between the pressure of the driving fluid on the rolling membrane surface 20 at the one hand and the force of the compression spring 21 at the other hand, the rolling membrane 20 moves downwardly whereby the valve disc 25 is seated. Due to the difference in pressure in the conduit 5 between the driving fluid pressure at the one hand and the outlet pressure in the measuring conduit 1 at the other hand the check valve 3 is closed.

Resetting the safety device to the normal operative condition is done by equalizing the pressures at both sides of the valve 25. Thereafter the control conduit 17 has to be exhausted, whereby the pressure in the actuating chamber 7, the conduit 5, the control port 15 and the conduit 16 decreases and thereby the valve disc 25 is moved upwardly under the influence of the force of the compression spring 21. Thereby the passage for the fluid in the main conduit 24 has been restored. Due to the pressure decrease in the measuring chamber 6 the membrane 10 closes the control valve 14 under the influence of the spring 12, so that the control port 15 is closed. Simultaneously the closing force of the check valve 3 on its seat 2 has decreased.

Figure 2:
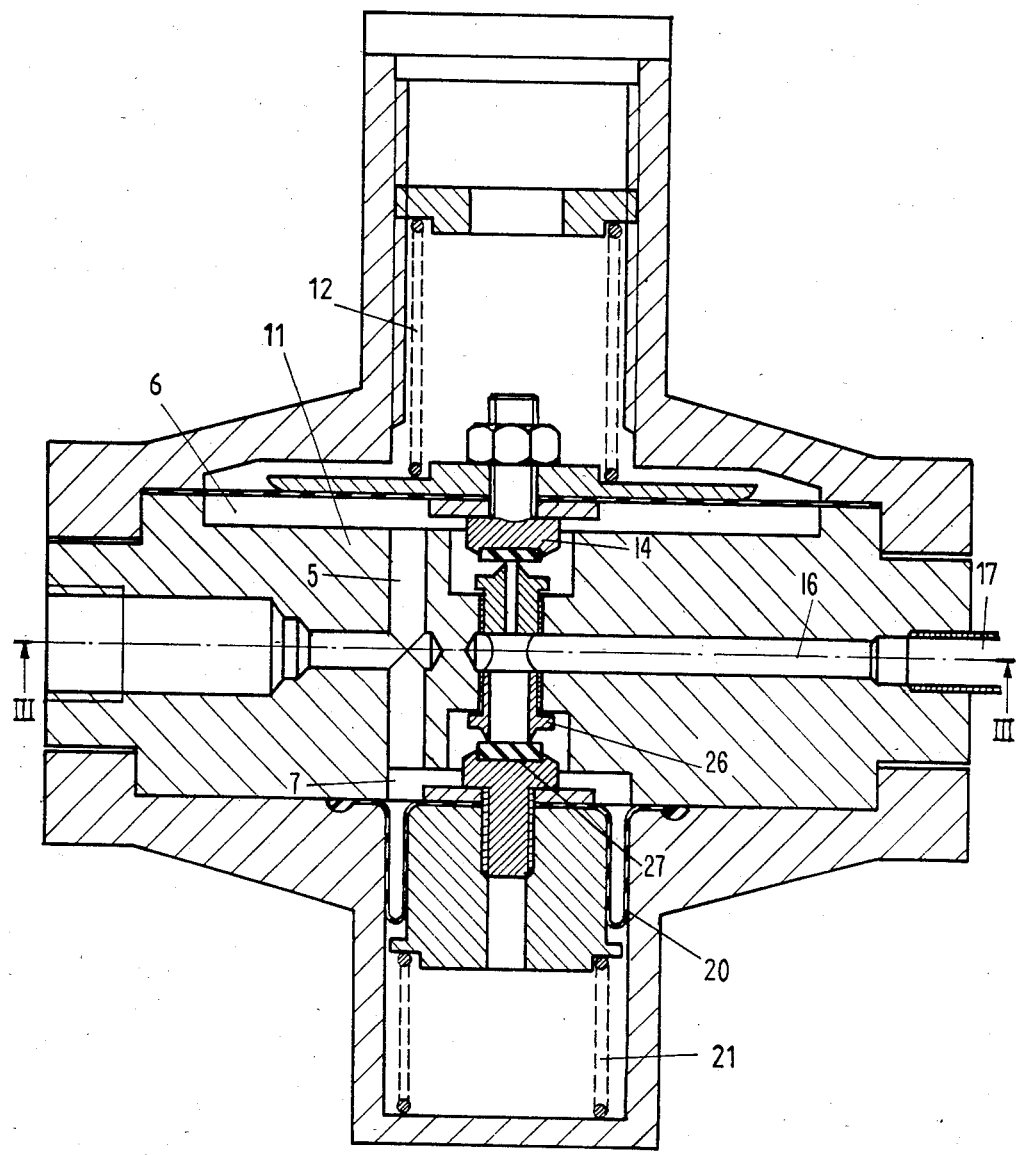
FIG. 2 is a section through a second embodiment which is suitable for actuating pneumatic pistons.
Figure 3:
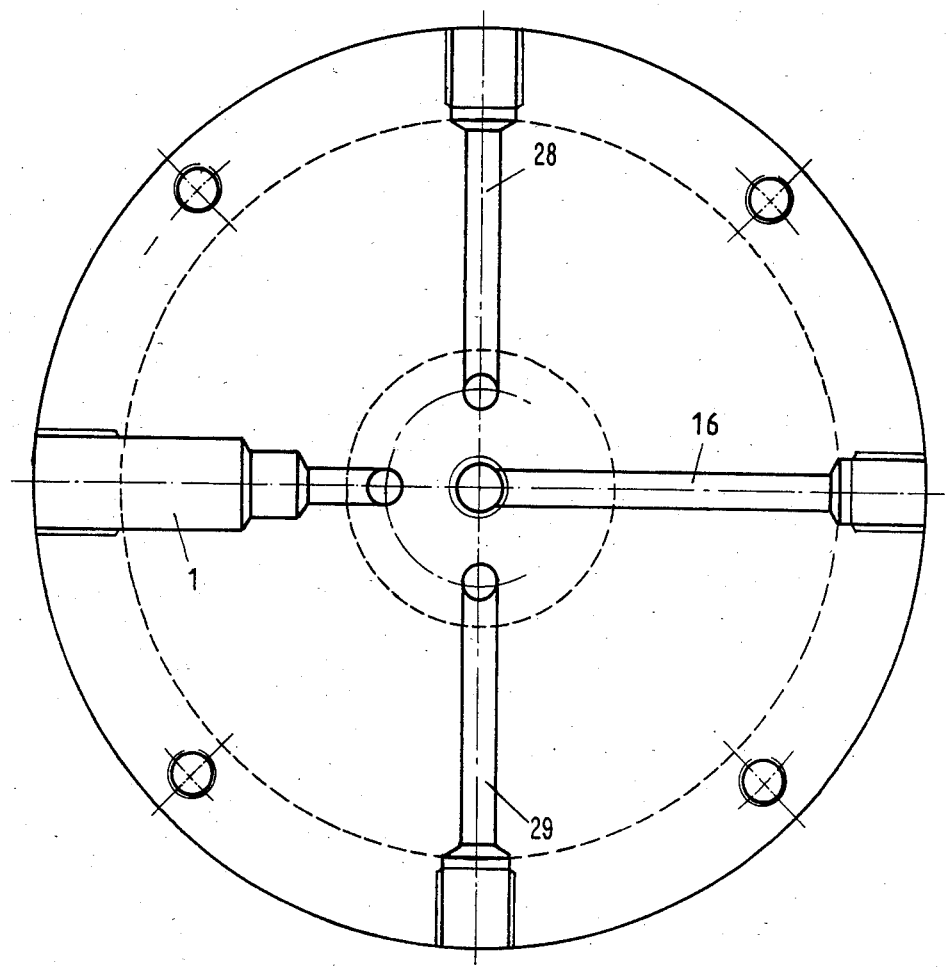
FIG. 3 is a crosssection parallel to the membranes, according to the line III—III in FIG. 2.

FIGS. 2 and 3 show a modification of the first embodiment according to FIG. 1, in which figures like reference numbers have been used for parts corresponding with those in FIG. 1.

In this modification the control housing 11 comprises a second control port 26, which communicates with the control conduit 16 of the control conduit 17. The control port 26 is sealed by a control valve 27 which is secured to the rolling membrane 20. Furthermore the control housing comprises one or more, in the embodiment shown two, additional conduits 28 and 29 (see FIG. 3) to which control apparatus (not shown) may be connected, such as pneumatically actuated valves, as cylinders and so on. The spring 21 is adjusted or designed such that the pressure of the driving fluid in the conduit 16, together with the outlet pressure in the chamber 7, does not exceed the force of the spring 21. Thereby in the rest condition the control valve 27 is in engagement with the control port 26.

If the outlet pressure in the measuring chamber 6 exceeds the limit value adjusted through the spring 12, the control valve 14 is opened. Thereby the driving fluid in the conduit 16 enters the measuring chamber 6 and the actuating chamber 7 and overcomes the force of the spring 21 so that the rolling membrane rolls out. Thereby the control valve 27 releases the control port 26. Due to the fact that the crosssection of the control port 26 is substantially larger than that of the control port 15, the chambers 6 and 7 become quickly filled by the driving fluid which propagates in the conduits 28 and 29. These in turn transmit the pressure to the connected control apparatus, e.g. air pistons.

The advantage of said second embodiment is that the actuating time of the device is very short. For resetting the safety device to the normal operating condition, the control conduit 17 must be exhausted.

Figure 4:
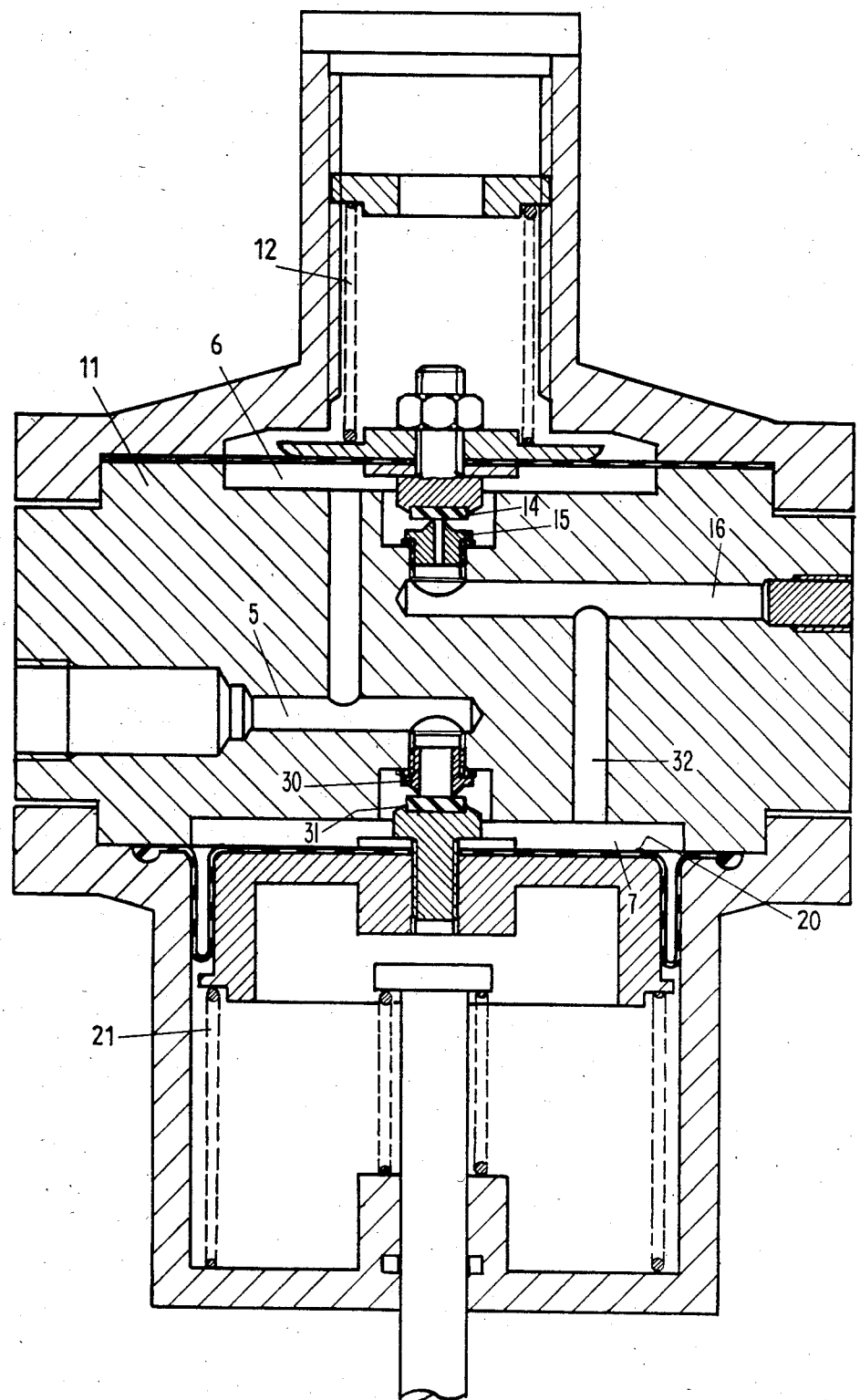
FIG. 4 is a section through yet another embodiment.

A further embodiment is shown in FIG. 4. Also herein like reference numbers indicate parts corresponding to those of both previous embodiments. This modification may be used in cases in which the outlet pressure in the measuring conduit 1 is sufficiently high to enable it to actuate the safety valve 25 in the main conduit 24 by overcoming the compression spring 12 by itself. Thereby the connection of the driving fluid in the conduit 17 to the conduit 16 may be eliminated or may be used for external connection of any pneumatic actuating pistons. Therefore the conduit 16 has been shown in FIG. 4 as closed off by a plug.

In this embodiment the conduit 5 carrying the outlet pressure is provided with a control port 30, which is engaged by a control valve 31 which is secured to the rolling membrane 20. Furthermore the conduit 16 communicates through a conduit 32 in the control housing with the actuating chamber 7. The spring 21 has in this case been adjusted such that the outlet pressure which may act on the control valve 30, is smaller than the spring force. Thereby in the rest position the control valve remains engaged with the control port 30.

If the outlet pressure in the measuring chamber 6 exceeds the previously adjusted spring force of the spring 12, i.e. exceeds the limit value, the control valve 14 is lifted from the control port 15, whereby the outlet pressure communicates through the conduits 16 and 32 with the actuating chamber 7. Thereby the rolling membrane 20 rolls out and the control valve 31 becomes released from the control port 30, so that the outlet pressure may flow through the control port 30, the crosssectional area of which is substantially larger than that of the control port 15. Thereby the rolling membrane 20 is quickly rolled out. The rolling membrane 20 again may influence control apparatus, e.g. a valve or the valve rod 22 of the valve disc 25. For resetting the safety device to the operational condition the supply conduit 1 is exhausted.

It will be clear that the actuating membrane of the safety valve may also be a flat membrane instead of a rolling membrane (namely if only a small actuating stroke is necessary), or likewise a piston (if a specially large stroke is necessary).

I claim:

1. A safety device against overpressure of a gaseous or liquid fluid, whereby a safety valve in a main supply conduit for the fluid is actuatable by means of a spring loaded actuating member mounted in a housing, e.g. a first membrane, the pressure to be controlled being connectable through an inlet conduit in the housing, characterized in that said inlet conduit communicates with a measuring chamber of a second or measuring membrane to which a first control valve is secured, said control valve in its closed position closing the communication between an actuating fluid source and an actuating chamber of the first or actuating member, a communicating conduit being provided between said measuring chamber and said actuating chamber, a second conduit providing communication between the actuating fluid source and said actuating chamber, a control port in said second conduit opening into said actuating chamber, and a second control valve secured to said actuating member and adapted to close said control port.

2. A device according to claim 1, characterized in that the crossectional area of the control port of the second control valve is substantially larger than that of the control port of the first mentioned control valve.

3. A device according to claim 1, characterized in that the housing comprises one or more conduits opening into the actuating chamber of the actuating membrane and communicating with a pneumatic switch or piston serving for the actuation of the safety valve in the supply conduit for the fluid.

4. A device according to claim 1 characterized in that the actuating member is a pneumatic two-way valve or three-way valve, which forms an integrated part of the device.

5. A safety device against overpressure of a gaseous or liquid fluid, whereby a safety valve in a main supply conduit for the fluid is actuatable my means of a spring loaded actuating member mounted in a housing, e.g. a first membrane, the pressure to be controlled being connectable through an inlet conduit in the housing, characterized in that said inlet conduit communicates with a measuring chamber of a second or measuring membrane to which a first control valve is secured, said control valve in its closed position closing the communication between an actuating fluid source and an actuating chamber of the first or actuating membrane, a communicating conduit being provided between said measuring chamber and said actuating chamber, a second control valve secured to said actuating member inserted in said communicating conduit between said measuring chamber and actuating chamber, a second communication conduit being provided between said chambers, said second conduit including said first control valve.

6. A device according to the claim 5, characterized in that the crosssectional area of the control port of the second control valve is substantially larger than that of the control port of the first control valve.

7. A device according to claim 6, characterized in that a pneumatic switch, e.g. a two-way valve, communicating with the actuating chamber of the actuating membrane, is provided interiorly of the housing of the device.

8. A device according to claim 7, characterized in that a conduit communicating with the measuring chamber of the measuring membrane, communicates interiorly of the housing with a port of the pneumatic valve.

9. A device according to claim 5 characterized in that the actuating member is a pneumatic two-way valve or three-way valve, which forms an integrated part of the device.

10. A safety device for closing and maintaining the closed condition of a fluid conduit upon occurrence of a fluid pressure greater than a predetermined fluid pressure therewithin, said device comprising: a safety valve in the conduit, a housing enclosing an actuating mechanism for said safety valve including spring means biasing said safety valve into a normally open position, said actuating mechanism including an actuating membrane disposed in an actuating chamber in said housing, said actuating membrane being responsive upon a pressure condition of said actuating chamber greater than said predetermined fluid pressure to effect closure of said safety valve, said housing including a measuring chamber containing a measuring membrane, spring means biasing said measuring diaphragm against the force of fluid pressure in said measuring chamber, conduit means providing fluid communication between the fluid conduit, said actuating chamber and said measuring chamber, an actuating fluid conduit in said housing communicating with a source of actuating fluid having a pressure greater than said predetermined pressure, normally closed control valve means connected to and operable by said measuring diaphragm for admitting actuating fluid from said actuating fluid conduit into said measuring chamber upon occurrence of a fluid pressure greater than the predetermined fluid pressure in said measuring chamber, the opening of said control valve means permitting actuating fluid to flow into and pressurize said actuating chamber to effect and maintain the closure of said safety valve, said control valve means upon opening being maintained in the open condition by the presence of said actuating fluid in the measuring chamber.

11. The invention as claimed in claim 10 including means interrupting communication between said inlet conduit and said measuring and actuating chambers upon opening of said control valve.

* * * * *